United States Patent [19]
Winter

[11] 3,868,653
[45] Feb. 25, 1975

[54] ERASABLE OPTICAL MEMORY
[75] Inventor: Donald C. Winter, Palos Verdes Peninsula, Calif.
[73] Assignee: TRW Inc., Redondo Beach, Calif.
[22] Filed: Oct. 1, 1973
[21] Appl. No.: 402,660

[52] U.S. Cl... 340/173 LS, 340/173 CC, 350/160 R
[51] Int. Cl. .................................................... G11b
[58] Field of Search. 340/173 LT, 173 LM, 173 LS, 340/173 CC; 350/160 R

[56] References Cited
UNITED STATES PATENTS
3,559,185   1/1971   Burns.............................. 340/173.2

Primary Examiner—Terrell W. Fears
Attorney, Agent, or Firm—Daniel T. Anderson, Esq.; Edwin A. Oser, Esq.; Jerry A. Dinardo

[57] ABSTRACT

An erasable optical memory consisting of a polycrystalline material having electro-optical properties and a birefringence inducible by an electric field and by photons. The material must also be transparent to light within a predetermined wavelength region. Such a material may consist of lead, lanthanum, zirconium titanate (PLZT). A spatially modulated light beam is projected on the material which is preferably in the form of a thin plate. As a result a substantially permanent birefringence is induced in the material. This birefringence pattern or variation of the birefringence directly represents the data used to modulate the light beam. An electric field may be applied to the material having at least a component normal to the axis of the light beam. The data may be directly read out by a light beam to which the material is transparent and by using a polarizer ahead of and behind the electro-optical plate.

13 Claims, 3 Drawing Figures ic grating is recorded in the material when a reference beam and a modulated scene beam are caused to impinge on the ceramic material. Accordingly the data is recorded in the form of a grating which may be read out by illuminating the material with the reference beam. While the grating does represent the data which has been recorded it is not directly representative of the modulations of the scene beam.

ERASABLE OPTICAL MEMORY

BACKGROUND OF THE INVENTION

This invention relates generally to optical data recording systems, and particularly relates to an erasable optical memory for such a system.

It has been proposed in the past to make use of single crystals of electro-optical material for the purpose of holographically storing data therein. Such single crystals have been disclosed, for example, in a paper by Chen et al. which appears in Applied Physics Letters, Oct. 1, 1968, Volume 13, Number 7, pages 223 to 225 and which is entitled "Holographic Storage in Lithium Niobate." It has been found as explained in the paper that the single crystal suffers a change in the refractive indices upon exposure to intensive light. As a result a volume hologram may be stored in the crystal.

However, single crystals of this type of material such as lithium niobate are difficult to make and cannot be grown in relatively large sizes.

Another paper by Thaxter which appears in Applied Physics Letters of Oct. 1, 1968, Volume 15, Number 7, pages 210 through 212, is entitled "Electrical Control of Holographic Storage in Strontium-Barium Niobate." Again according to the paper single crystals of strontium-barium niobate having electro-optical properties are used to provide volume holographic storage. Accordingly, the same remarks previously made apply to this holographic volume storage medium.

The mechanism which is probably involved is the creation of the space charge field which in turn causes a change of the indices of refraction or the birefringence as explained in a paper by Chen which appears in the Journal of Applied Physics of July 1969, Volume 40, Number 8, pages 3389 through 3,396. The paper is entitled "Optically Induced Change of Refractive Indices in LiNbO$_3$ and LiTaO$_3$." Briefly, the theory specifies that the photons of a light beam due to a photoelectric effect liberate electrons from the crystal which are subsequently trapped by suitable traps in the single crystals of lithium niobate or lithium titanate. This change of the spatial distribution of the electrons by means of the electron traps causes a variation of the space charge field. This in turn may cause changes of the refractive indices due to the electro-optical effect of the material. However, it should be noted again that the theory applies to single crystals only. Presumably the electron traps are caused by impurities in the crystal.

A recent paper by Micheron et al. appears in Contes Rendues, Series B of Jan. 31, 1972, on pages 361 through 364 and is entitled "Recording of Holographic Gratings in Transparent Ferroelectric Ceramics." Specifically, the paper discusses an electro-optical ceramic which is polycrystalline and which is referred to as lead, lanthanum, zirconium titanate, sometimes referred to as PLZT from the initials of the corresponding elements. It forms a mixture analogous to an intermetallic compound which may be defined as follows: pb $_{(1-3x/2)}$La$_x$(Zr$_y$Ti$_z$)O$_3$. The values for $x$, $y$, $z$ may be varied for various applications. Usually the following values are used $x = .09$, $y = .65$ and $z = .35$. This will yield a composition of pb$_{.865}$La$_{.09}$(Zr$_{.65}$Ti$_{.35}$)O$_3$.

The paper describes that a hologram may be stored in a thin plate of PLZT and that an electric field must be applied across the material normal to the direction of the axis of the beam. Since PLZT does not only have electro-optical properties but also a birefringence inducible by an electric field and by photons, a holographic grating is recorded in the material when a reference beam and a modulated scene beam are caused to impinge on the ceramic material. Accordingly the data is recorded in the form of a grating which may be read out by illuminating the material with the reference beam. While the grating does represent the data which has been recorded it is not directly representative of the modulations of the scene beam.

A subsequent paper by Micheron et al. appears in the Digest of Techincal Papers, Mar. 19–21, 1973 of a Topical Meeting on Optical Storage of Digital Data published by the Optical Society of America. The paper in question appears at MB3-1 through MB3-4. It points out that the holographic efficiency may be enhanced by an applied electric field which causes an electrical amplification of the holographic readout efficiency.

It is accordingly an object of the invention to provide an erasable optical memory which does not require a holographic recording.

Another object of the present invention is to provide an erasable optical memory which neither requires a single crystal nor a coherent light source for the recording step.

A further object of the present invention is to provide an optical memory of the type discussed where variations of the birefringence induced in the material are directly representative of the data that has been recorded.

SUMMARY OF THE INVENTION

In accordance with the present invention there is provided an erasable optical memory. The memory comprises a polycrystalline material which has electro-optical properties. In addition the material is capable of birefringence which may be induced by an electric field and by photons. Furthermore, the material must be transparent to light within a predetermined wavelength region. Such a material may, for example, be the PLZT material previously referred to.

Means are provided for generating and projecting an intense light beam onto the material. Means are also provided, such for example, as a transparency and interposed into the path of the light beam for modulating its intensity in accordance with the data to be stored. This will induce a substantially permanent birefringence in the material which is respresentative of the data.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
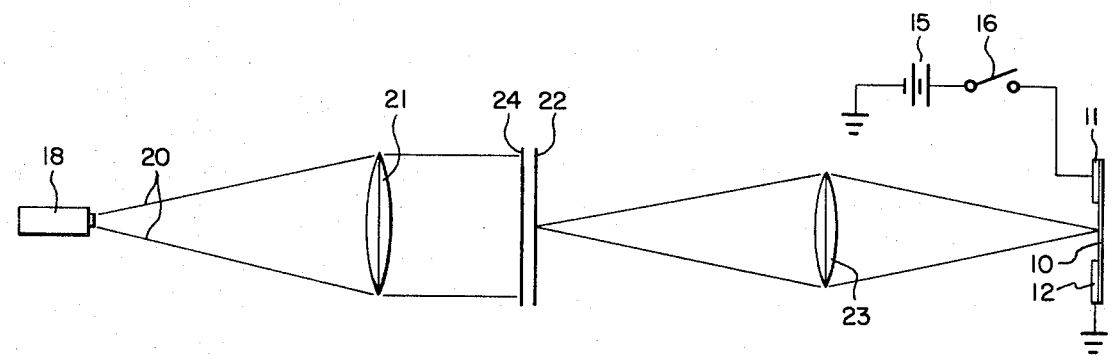
FIG. 1 is a schematic elevational view of an optical data recording system including the erasable memory of the invention.
Figure 2:
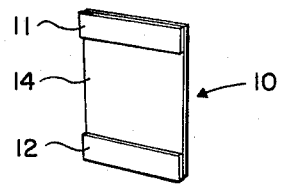
FIG. 2 is a view in perspective of the memory material having a pair of electrodes provided thereon.

Referring now to the drawing and particularly to FIGS. 1 and 2, there is illustrated an optical data recording system including the erasable memory of the present invention. The memory of the invention consists of a plate 10 which, as explained before, consists of a polycrystalline material having electro-optical properties and a birefringence inducible by an electric field and by photons. As explained before, such a material may result from lead lanthanum zirconium titanate or PLZT. The general composition of this material has already been given as well as a particular preferred composition.

This material has a birefringence which can be induced or changed either by the application of an electric field or by the photons of a light beam. It is believed that the photons liberate electrons from the material. These electrons under the influence of an electric field migrate away from their origin until they are trapped by electron traps. The electrons may also migrate due to thermal effects. It is presently believed that the electron traps may be due to the boundaries between individual crystals of the polycrystalline material rather than due to impurities. Due to the redistribution of the electrons an electric field is generated within the crystal. However, in most cases it may be desired to apply an external field which should at least have a component normal to the axis of the incident light beam.

The theory given hereinabove is tentative only and has not been proven experimentally.

The polycrystalline material 10 may consist of a plate or wafer as shown more clearly in FIG. 2 and may, for example, have a thickness on the order fo 100 microns. Its thickness is of course large compared to the wavelength of visible light but is small compared to the depth of focus of the lens.

The plate 10 may be provided with a pair of electrodes 11 and 12 which may, for example, be applied on the crystal face 14 facing a light beam but only partially covering the face 14. An electric field may be applied to the electrodes 11 and 12 by a source of voltage 15 through a switch 16. One terminal of the voltage source 15 may be grounded while the other terminal is applied to the electrode 11; the electrode 12 may be grounded as shown.

In order to induce the birefringence to provide a substantially permanent data storage there is provided a light source 18. Any source of light may be used for this purpose provided it has a sufficient intensity such as on the order of a few milliwatt per square centimeter. Blue or green light is preferred due to the higher energy of the photons compared to say red light. A laser such as shown at 18 will readily provide the necessary intensity. However, it should be noted that there is no necessity to provide a coherent light source.

The light beam 20 from the light source 18 may be divergent as shown and may be collimated by a condenser lens 21. The collimated light beam may now be modulated in any convenient manner, for example, by a transparency 22 interposed into the collimated light beam.

The light from the transparency 22 may now be focused by another imaging lens 23 at the face 14 or within the plate 10. Preferably the light beam is normal to the face 14 of the plate 10.

It should be noted that while the polycrystalline material or plate 10 is transparent to light within a predetermined wavelength, the illuminating light beam 20 need not be within the wavelength region to which the plate is transparent. In order words the light beam could be of any desired color. It is sufficient if it penetrates a few wavelengths into the plate 10 to record the data. When it is desired to apply an electric field across the crystal the switch 16 should be closed while the plate 10 is being illuminated. The electric field may be on the order of ten kilovolt per centimeter.

As explained before the light beam 20 preferably has an axis normal to the face 14 of the plate 10. On the other hand the external electric field applied across the crystal should have at least a component at right angles to the axis of the light beam. It will be quite obvious that it is desired to move the liberated electrons away from their origin so that the electric field should be parallel to the face 14 of the plate 10.

In order to record the optical data it is necessary to provide high frequency spatial modulation components substantially normal to the direction of the electric field. To this end a mask 24 may be interposed into the path of the collimated light beam so as to be in focus of the material 10. Therefore the mask 24 may be disposed close to the transparency 22 or directly in front of the material 10. The mask could, for example, consist of a grid or a grating with lines which are normal to the direction of the electric field. On the other hand, where the data is such that it already provides the desired high frequency spatial modulation components, there is no need to provide such a mask 24.

It has been found that the PLZT material will provide a resolution of at least 1,000 lines per millimeter, the resolution being limited more by the lens than by the material.

Figure 3:
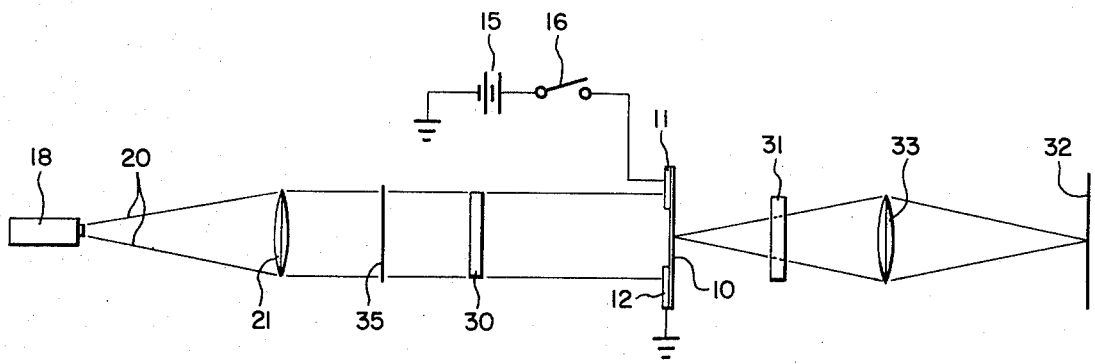
FIG. 3 is a schematic elevational view of a system for reading out the data previously recorded on the memory of the invention.

Experiments have shown that the induced birefringence will remain within the crystal for a period of several days. The previously recorded data in the plate 10 may be read out by the apparatus illustrated in FIG. 3 to which reference is now made.

Due to the redistribution of the electrons in the plate 10 a birefringence is generated which varies locally in accordance with the date that has been recorded. This local variation of the birefringence is directly representative of the recorded data. Accordingly the data can be read out by illuminating the plate 10 with a first polarizer provided ahead of the plate 10 and a second polarizer behind the plate 10.

Accordingly FIG. 3 again illustrates a light source 18 and lens 21 to generate a collimated light beam falling on the plate 10. A first polarizer 30 is provided ahead of the plate 10 to provide a polarized light bean and a second polarizer 31 is disposed behind the plate 10. The two polarizers 30 and 31 should have polarization axes at 90° with respect to each other. Thus, preferably, the polarizer 30 should have an axis of polarization of the light of 45° relative to the space charge fields. This will then project the data previously recorded on a viewing screen 32 on which the data is focused by a lens 33. It will be understood that this provision of the two polarizers simply creates light and dark areas where the light is permitted to pass or not to pass depending on the data previously recorded. In other words, the net effect of the recording step is to rotate the direction of polarization of a light beam.

It will now be evident that in order to read out the data previously recorded the light beam must fall into the wavelength region to which the plate 10 is transparent. For example, if the material is transparent to red, the blue light may be removed by a wavelength cut-off filter 35 interposed into the light beam before it reaches the plate 10.

The optical memory on plate 10 can be erased by a high intensity light beam which may have a light intensity on the order of 100 milliwatts per square centimeter. The plate may have to be illuminated for a period of time sufficiently long so that the electrons are substantially uniformly redistributed across the plate 10. It should be also noted that there is no need to apply an electric field across the plate 10 either for retaining the data previously recorded or for erasing it. It will also be understood that the electric field may be applied in some other fashion. Thus instead of applying the electrodes partially along the face 14 of the material the electrodes could be applied along the edges of the polycrystalline material.

There has thus been disclosed an erasable optical memory consiting of a polycrystalline plate of a material such as PLZT having electro-optical properties and a birefringence inducible by an electric field and photons. The data is recorded by a modulated light beam and is directly represented by variations of the birefringence within the plate-like material. These variations cause a rotation of the plane of polarization of a readout light beam. The readout light beam must be within the wavelength region where the material is transparent. This is not true of the recording beam. The memory may be erased by applying thereto a high intensity light beam which serves the purpose to redistribute the electrons substantially uniformly throughout the crystal. The optical memory will remain for a period of days and can be read out during that period.

What is claimed is:

1. An erasable optical memory comprising:
   a. a polycrystalline material having electro-optical properties and a birefringence inducible by an electric field and by photons, and said material being transparent to light within a predetermined wavelength region;
   b. means for generating and projecting an intense light beam onto said material; and
   c. means interposed into the path of said light beam for modulating the intensity of said light beam in accordance with the data to be stored, whereby a substantially permanent birefringence is induced in said material representative of the data.

2. A memory as defined in claim 1 wherein said material consists of lead lanthanum zirconium titanate.

3. A memory as defined in claim 2 wherein said material has the following composition:

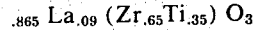

4. A memory as defined in claim 1 wherein electrodes are provided on said material, and means for supplying a voltage to said electrodes to create an electric field in said material having at least a component at right angles to the axis of the light beam projected thereon.

5. A memory as defined in claim 4 wherein a grating is interposed into the path of said light beam, the lines of said grating being oriented substantially normal to the direction of said electronic field.

6. A memory as defined in claim 1 wherein said material has the form of a thin plate having a plane face facing said light beam.

7. A memory as defined in claim 6 wherein said electrodes extend partially over said plane face of said material.

8. A memory as defined in claim 4 wherein said means for modulating consists of a transparency containing said data.

9. A memory as defined in claim 8 wherein a mask is interposed into the path of said light beam to provide high frequency spatial modulation components substantially normal to the direction of said electric field.

10. A memory as defined in claim 9 wherein said mask consists of a grating.

11. The method of recording an erasable optical memory on a polycrystalline material, said material having electro-optical properties and a birefringence inducible by an electric field and by photons, and said material being transparent to light of a predetermined wave length region, said method comprising the steps of:
   a. projecting an intense light beam onto the material; and
   b. modulating the intensity of the light beam in accordance with the data to be stored to induce in the material variations of the birefringence representative of the data to be stored.

12. The method defined in claim 11 which includes the additional step of generating an electric field in the material having at least a component at right angles to the axis of the light beam.

13. The method of erasing an optical memory, said optical memory consisting of a polycrystalline material, said material having electro-optical properties and a birefringence inducible by an electric field and by photons, and said material being transparent to light of a predetermined wavelength region, said material having stored therein a pattern of substantially permanent birefringence directly representative of the data, said method comprising the step of:
   illuminating the material with an intense light beam for a sufficient period of time until the previously recorded pattern of birefringence has been substantially equalized, thereby to erase the data.

* * * * *

UNITED STATES PATENT OFFICE
CERTIFICATE OF CORRECTION

PATENT NO. : 3,868,653
DATED : February 25, 1975
INVENTOR(S) : Donald C. Winter

It is certified that error appears in the above-identified patent and that said Letters Patent are hereby corrected as shown below:

Column 5, line 57 "$.865\ La_{.09}(Zr_{.65}Ti_{.35})\ O_3$"

should be cancelled and

--$Pb_{.865}\ La_{.09}(Zr_{.65}Ti_{.35})\ O_3$-- substituted therefor.

Signed and sealed this 13th day of May 1975.

(SEAL)
Attest:

RUTH C. MASON
Attesting Officer

C. MARSHALL DANN
Commissioner of Patents
and Trademarks